(12) United States Patent
Natarajan et al.

(10) Patent No.: US 9,674,565 B2
(45) Date of Patent: Jun. 6, 2017

(54) SYSTEM AND METHOD FOR PERSONALIZATION THROUGH INTELLIGENT REMOTE APPLICATION

(71) Applicant: Wipro Limited, Bangalore (IN)

(72) Inventors: Gowrishankar Subramaniam Natarajan, Chennai (IN); Sayar Banerji, Kolkata (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/930,131

(22) Filed: Nov. 2, 2015

(65) Prior Publication Data
US 2017/0070762 A1 Mar. 9, 2017

(30) Foreign Application Priority Data

Sep. 3, 2015 (IN) ............................ 4668/CHE/2015

(51) Int. Cl.
| | |
|---|---|
| *H04N 21/258* | (2011.01) |
| *H04N 21/24* | (2011.01) |
| *H04N 21/25* | (2011.01) |
| *H04N 21/2668* | (2011.01) |

(52) U.S. Cl.
CPC ... *H04N 21/25816* (2013.01); *H04N 21/2407* (2013.01); *H04N 21/251* (2013.01); *H04N 21/25891* (2013.01); *H04N 21/2668* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,336,773 B2* | 12/2012 | Trimper | ............. | H04N 21/4126 235/382 |
| 8,650,587 B2 | 2/2014 | Bhatia et al. | | |
| 2012/0233286 A1 | 9/2012 | Chee et al. | | |
| 2013/0194503 A1* | 8/2013 | Yamashita | ........... | H04N 5/4403 348/563 |
| 2016/0142783 A1* | 5/2016 | Bagga | ............. | H04N 21/47214 725/47 |

\* cited by examiner

*Primary Examiner* — Mulugeta Mengesha
(74) *Attorney, Agent, or Firm* — LeClairRyan, a Professional Corporation

(57) ABSTRACT

The present disclosure relates to a method of providing media personalization for one or more users using an electronic device. The method comprises receiving, by an electronic device, a profile activation request from one or more user devices for activating a predefined profile associated with each of the one or more users. The method further comprises assigning an active operation status for one of the one or more user devices and a passive operation status for rest of the one or more user devices based on predefined policy information. The method further comprises activating a primary functionality of controlling the electronic device for the user device having the active operation status and one or more secondary functionalities for the rest of the one or more user devices. The method further comprises applying the predefined profile associated with the user device having the active operation status for the media personalization.

19 Claims, 9 Drawing Sheets

SYSTEM AND METHOD FOR PERSONALIZATION THROUGH INTELLIGENT REMOTE APPLICATION

This application claims the benefit of Indian Patent Application Serial No. 466/CHE/2015 filed Sep. 3, 2015, which is hereby incorporated by reference in its entirety.

FIELD

The present subject matter is related, in general to a digital media management system using remote application configured in a user device and more particularly, but not exclusively to a method of providing media personalization for one or more users using an electronic device.

BACKGROUND

Currently, most of the smart phones, tablets and other web platforms are equipped with a remote application which allows users to control the video viewing experience remotely. Generally, setting up the remote application is simple and they are configured to work with multiple Customer Premise Equipment (CPE) devices including Set-Top box (STB), Digital television (DTV) and Digital Video Recorder (DVR) within a home network. The usage of the remote applications has been increased with increase in the use of smartphones, web platform and other second screen platforms within the home network. Further, the remote applications provide better user experience as they have the ability to bring in new functionality in the remote control without the need for any hardware upgrades. Also, the universal remote application has the ability to add multiple remotes for different CPE devices such as DTV, DVR, STB, and Audio Systems with a single remote application being switched seamlessly between these devices to avoid the hassle of operating multiple remotes simultaneously.

At present, most of these remote applications are used for controlling the CPE devices. However, for such remote applications, identification and also knowledge of the actual "USER" using the remote application is minimal because CPE remote applications are not based on user profile. Further, it is not possible to track users' video consumption pattern at the remote application though these applications run on personal devices such as mobile phones. The other problems with the existing remote applications are that though there is only a single active remote control application controlling the CPE at any given point in time and is available with one viewer, other viewers within the room do not get to access other activities include, but are not limited to, schedule viewing, recording through their remote applications. This is because the CPE does not recognize multiple remote applications within the home concurrently.

Currently, a lot of effort and money is spent on performing analytics in the backend to interpret video consumption patterns of the user, since different users access the CPE devices using the same remote and specific user information is not available when the remote is being used by the user. Further, the analytics is currently performed on video consumption patterns without the actual knowledge of the specific user on home devices such as STB and mobile platforms. Hence, there is a possibility of high number of false positives in terms of assessing the user behavior. This results in generic recommendations rather than targeted recommendations and also leads in incorrect advertisement schemes rolled out for a user who has not actually consumed the specific content on which the advertisement was based.

One of the conventional methods discloses a technique for mobile content tracking. This technique offers a mechanism for channel surfing and program viewing using a mobile device. The technique also enables outsourcing the functions of a remote control or set-top box to a mobile device. As a result of which the mobile device is able to track video consumption pattern at the device level, but is unable to differentiate the video consumption patterns at the next level of granularity, which is user level.

The issues mainly faced in the existing systems are that, they do not account for multiple remote applications controlling the video viewing experience wherein the control is in active or passive mode and monitoring the video consumption pattern for every user thereby providing personalized video viewing suggestions.

SUMMARY

Disclosed herein is a method of providing media personalization for one or more users using an electronic device. The method provides a remote application which allows the user to create a profile for personalizing the media. The method also monitors media consumption pattern of each user to differentiate between the consumption patterns of different users and perform analytics at user profile level.

Accordingly, the present disclosure relates to a method of providing media personalization for one or more users. The method comprises receiving, by an electronic device, a profile activation request from one or more user devices for activating a profile associated with each of the one or more users. Thereafter, the electronic device assigns an active operation status for one of the one or more user devices and a passive operation status for rest of the one or more user devices based on policy information. The method further comprises activating, by the electronic device, a primary functionality of controlling the electronic device for the user device having the active operation status and one or more secondary functionalities for the rest of the one or more user devices. Further, the electronic device applies the profile associated with the user device having the active operation status for the media personalization.

Further, the present disclosure relates to an electronic device for providing media personalization for one or more users. The electronic device comprises at least one processor; and a memory communicatively coupled to the processor, wherein the memory stores processor-executable instructions, which, on execution, cause the processor to receive a profile activation request from one or more user devices for activating a profile associated with each of the one or more user devices. Upon receiving the profile activation request, the processor assigns an active operation status for one of the one or more user devices and a passive operation status for rest of the one or more user devices based on policy information. Further, the processor activates a primary functionality of controlling the electronic device for the user device having the active operation status and one or more secondary functionalities for the rest of the one or more user devices. Thereafter, the processor applies the profile associated with the user device having the active operation status for the media personalization.

Further, the present disclosure comprises a non-transitory computer readable medium including instructions stored thereon that when processed by at least one processor cause an electronic device to perform one or more operations comprising receiving a profile activation request from one or more user devices for activating a profile associated with each of the one or more users. The instruction further cause the processor to assign an active operation status for one of the one or more user devices and a passive operation status for rest of the one or more user devices based on policy information. Thereafter, the instructions cause the processor for activating a primary functionality of controlling the electronic device for the user device having the active operation status and one or more secondary functionalities for the rest of the one or more user devices. Further, the instructions cause the processor to apply the profile associated with the user having the active operation status for the media personalization.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
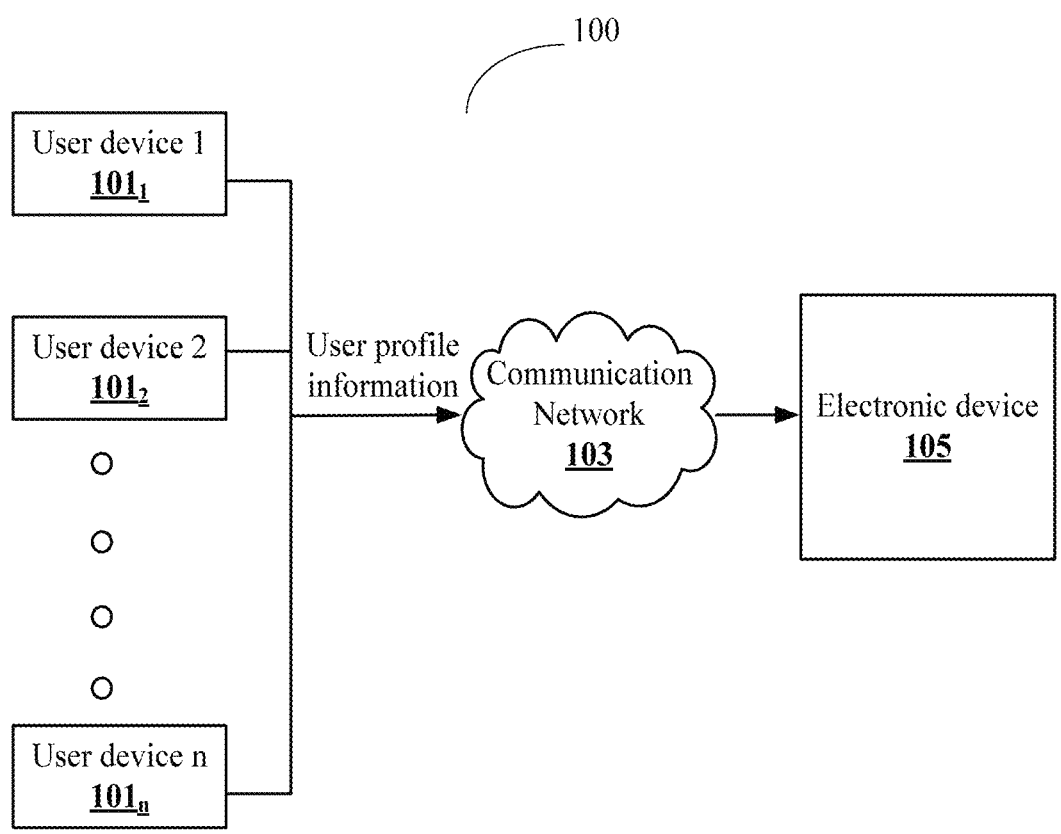
FIG. 1 shows an exemplary architecture for providing media personalization for one or more users using an electronic device with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method of providing media personalization for one or more users using an electronic device. In the present disclosure the media is a digital media, which includes, but not limited to, Video and Audio. Each user is associated with one or more user devices, wherein each user device is configured with a remote application for creating the profile and operating the electronic device. The user device sends a request to the electronic device to manage the user profiles. A profile activation request is sent to the electronic device using one or more user devices for activating a profile associated with each of the one or more users. In an embodiment, the profile is at least one of predefined by each of the one or more users and dynamically generated based on user interaction with the electronic device. Also the profile associated with each user is configurable in the one or more user devices. The electronic device assigns an operation status to each of the one or more user devices used by the one or more users. Active operation status is assigned to one of the one or more user devices and a passive operation status for rest of the one or more user devices based on policy information. In an embodiment, the policy information is at least one of predefined and dynamically generated by a service provider of the electronic device. The method further provides a primary functionality of controlling the electronic device for the user device having the active operation status and one or more secondary functionalities for the rest of the one or more user devices. Further, the electronic device applies the predefined profile associated with the user device having the active operation status for the media personalization and monitors the media consumption pattern of the user.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture illustrating a method of providing media personalization for one or more users using an electronic device with some embodiments of the present disclosure.

The architecture 100 comprises of one or more user devices, user device 1 1011 to user device n 101n (collectively referred to as user device 101), a communication network 103, and an electronic device 105. As an example, the one or more user devices 101, may include, but not limited to, a mobile phone, a tablet phone, a personal computer and a laptop. As an example, the electronic device 105, may include, but not limited to a set top box (STB), Digital video recorder (DVR) and Media gateway box. The communication network 103 may include, but not limited to, a wireless communication network.

One or more users interact with the electronic device 105 through the user devices 101. Each of the user devices 101 is configured with a remote application. The remote application allows the user to create a user profile. The user profile includes, but not limited to, profile information of the one or more users, login details related to the profile of the one or more users, operation status of the profile such as active or passive, list of device identification numbers with which the user was associated, preferences of the user such as brightness settings, contrast settings etc. list of the last few programs watched by the users, history related to the purchases made by the one or more users and list of favorite programs of the one or more users. In an embodiment, each user device 101 sends a profile activation request to the electronic device 105 through the communication network 103. The electronic device 105 provides an active operation status to one of the one or more user devices 101 and passive operation status to rest of the one or more user devices 101. The active operation status is associated with a primary functionality of controlling the electronic device 105. The primary functionality may include, but not limited to, changing channels, increasing or decreasing the volume and resolution settings. The passive operation status is associated with one or more secondary functionalities. The secondary functionalities may include but not limited to, video recording and browsing. Upon assigning the operation status, the electronic device 105 activates the one or more user devices 101 with their respective functionalities. The electronic device 105 applies the profile associated with the user device 101 having the active operation status for personalizing the media. Further, the electronic device 105 monitors the media consumption pattern of the user associated with the active operation status. The monitored media consumption pattern is provided to an aggregator associated with the electronic device 105 for performing analytics for providing one or more recommendations for advertising.

Figure 2A:
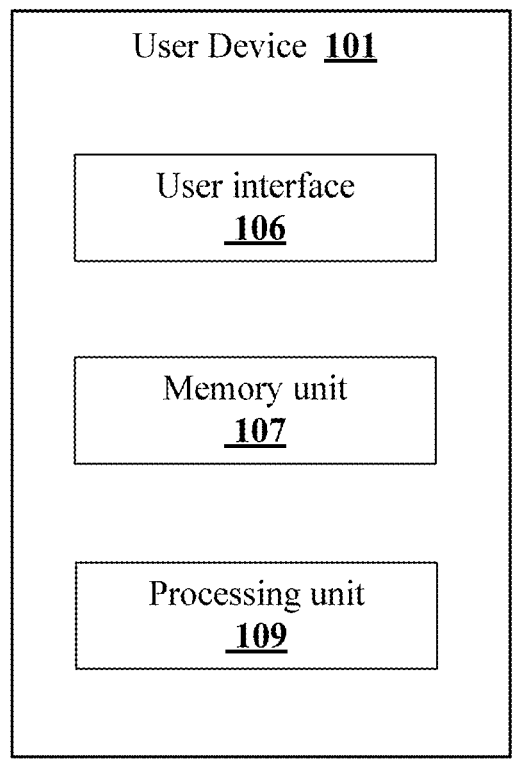
FIG. 2a shows a block diagram illustrating a user device in accordance with some embodiments of the present disclosure.

FIG. 2a shows a block diagram illustrating a user device in accordance with some embodiments of the present disclosure.

The user device 101 comprises a user interface 106, a memory unit 107 and a processing unit 109. The user interface 106 is configured to receive inputs from the user for the creation of the profile. Based on the inputs, the profile is created for each user. The created profiles for each user are stored in the memory unit 107. The processing unit 109 is configured to send activation request to the electronic device 105 to activate the profile associated with each of the one or more users of the user device 101. The processing unit 109 further receives the operation status of the one or more user devices from the electronic device 105. Upon receiving the operation status, the processing unit 109 activates the user profile with active operation status and monitors the media consumption pattern of the active user.

Figure 2B:
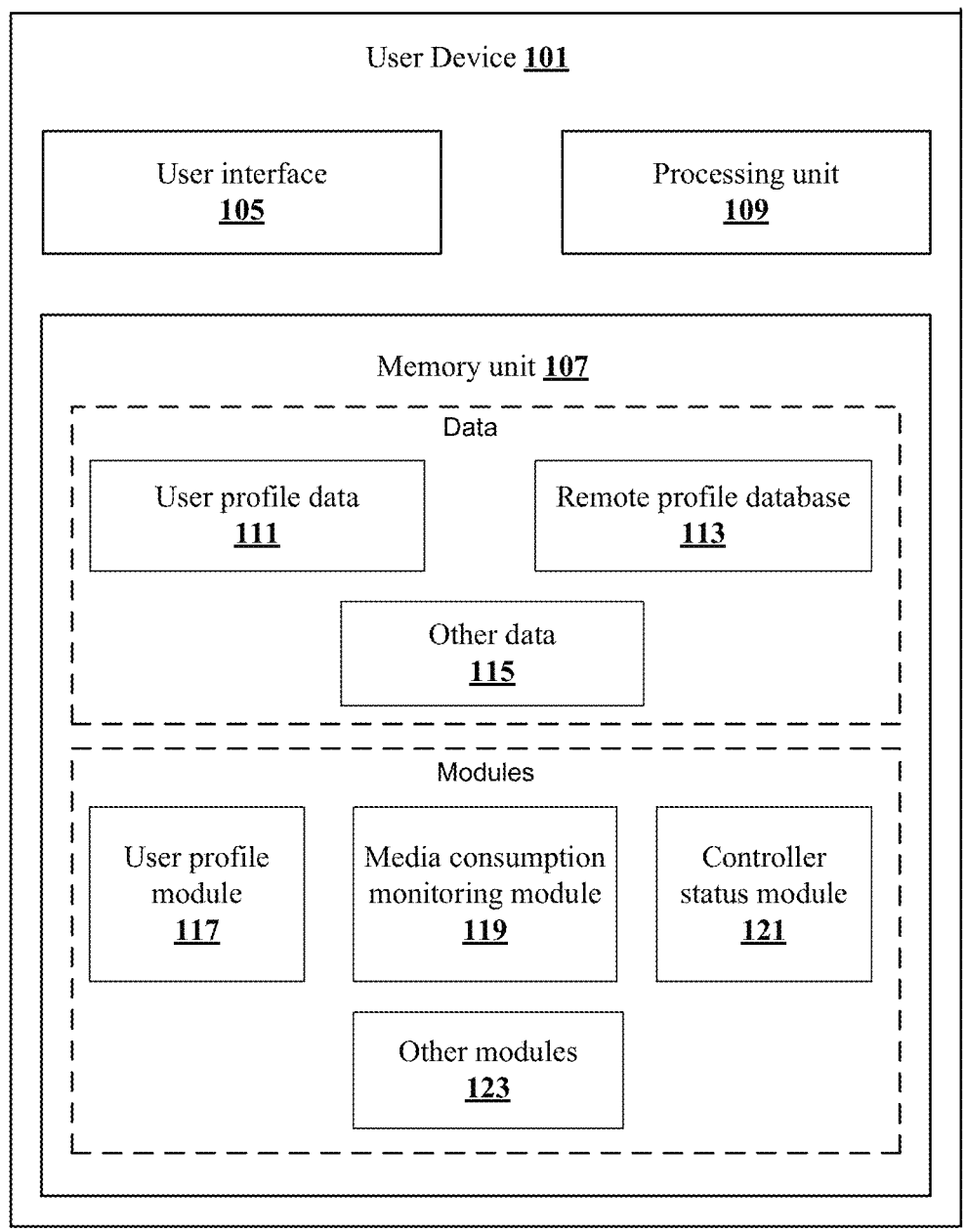
FIG. 2b shows a detailed block diagram illustrating a user device in accordance with some embodiments of the present disclosure.

FIG. 2b shows a detailed block diagram illustrating a user device in accordance with some embodiments of the present disclosure.

In one implementation, the user interface 106 is configured in the user device 101 to receive inputs from the user based on which a profile is created for each user. The user device 101 stores the data related to the one or more users in a memory unit 107. In an embodiment, the data includes user profile data 111. The user device 101 also includes remote profile database 113 and other data 115.

In one embodiment, the data may be stored in the memory unit 107 in the form of various data structures. Additionally, the aforementioned data can be organized using data models, such as relational or hierarchical data models. The other data 115 may store data, including temporary data and temporary files, generated by modules for performing the various functions of the user device 101.

In an embodiment, the user profile data 111 is provided by the one or more users of the user device 101. The user profile data 111 includes, but not limited to, profile information of the one or more users, login details related to the profile of the one or more users, operation status of the profile such as active or passive, list of device identifications numbers with which the user was associated, preferences of the user such as brightness settings, contrast settings etc. list of the last few programs watched by the users, history related to the purchases made by the one or more users and list of favorite programs of the one or more users. The user profile data 111 is stored in the remote profile database 113 configured in the user device 101.

In an embodiment, the data stored in the memory unit 107 is processed by the modules of the user device 101. The modules may be stored within the memory unit 107 as shown in the FIG. 2b. In an example, the modules, communicatively coupled to the processing unit 109, may also be outside the memory unit 107.

In an embodiment, the modules may include, for example, a user profile module 117, a media consumption monitoring module 119, a controller status module 121, and other modules 123. The other modules 123 may be used to perform various miscellaneous functionalities of the user device 101. It will be appreciated that such aforementioned modules may be represented as a single module or a combination of different modules.

In an embodiment, the user profile module 117 is configured for creating the profile for each user of the user device. The user may even add the profiles, delete the profiles or update the profiles. In an embodiment, the user profile module 117 is configured to download new profiles for creation from the electronic device 105. Further the user profile module 117 is configured for loading the user specific profile when the user is assigned with active operation status of the electronic device 105. Also the user profile module 117 is configured to unload the user profile data 111 of the user with the active status when the user with the active operation status logs out of the remote application.

In an embodiment, the controller status module 121 is configured to send profile activation request to the electronic device 105. As an example, the profile activation request may be provided using HTTP RESTFUL request. The controller status module 121 configures the remote application or the profile of the user to have either active operation status or the passive operation status upon receiving the status information from the electronic device 105. The active operation status is associated with primary functionality of controlling the electronic device 105. In an embodiment, the primary functionality may include, but not limited to, changing channels, increasing or decreasing the volume and resolution settings. The passive operation status is associated with one or more secondary functionalities. In an embodiment, the one or more secondary functionalities may include, but not limited to, video recording and browsing. The default configuration assigned to the one or more user devices 101 is passive operation status. At any given point of time, there is only one active user of the electronic device 105 activated with a primary functionality of controlling the electronic device 105. The rest of the one or more users are passive users and are activated with one or more secondary functionalities. The controller status module 121 updates the operation status of the one or more users to the user device 101. Further, the controller status module 121 triggers the user profile module 117 to load the preference of the active user of the electronic device 105 and personalize the media with respect to the current active user.

In an embodiment, the media consumption monitoring module 119 is configured to monitor the media consumption pattern of the user device 101 with the active operation status. The media consumption information of the user with the active operation status may include, but not limited to, channels watched, amount of time spent on a certain service by the user, history related to purchases, list of advertisements watched by the user, duration up to which an advertisement is watched by the user, favorite programs of the user and browse history of the user. Upon monitoring, the media consumption information of the user with active operation status is provided to the user profile module 117 to store the media consumption information in the remote profile database 113. The media consumption monitoring module 119 also provides the media consumption information to a user profile service module 139 configured in the electronic device 105 to perform light weight analytics. Light weight analytics is the basic analytics performed by the user profile service module 139 to personalize the media with respect to user's choice. As an example, light weight analytics performed by the user profile service module 139 includes, creating a view catalogue for the user with the active operation status. The view catalogue is created using the list of on demand channels and programs. Further, the view catalogue is recommended for the user with active operation status, when the user wants to discover the media content using but not limited to, guide listing, catalogue and search views.

Figure 3A:
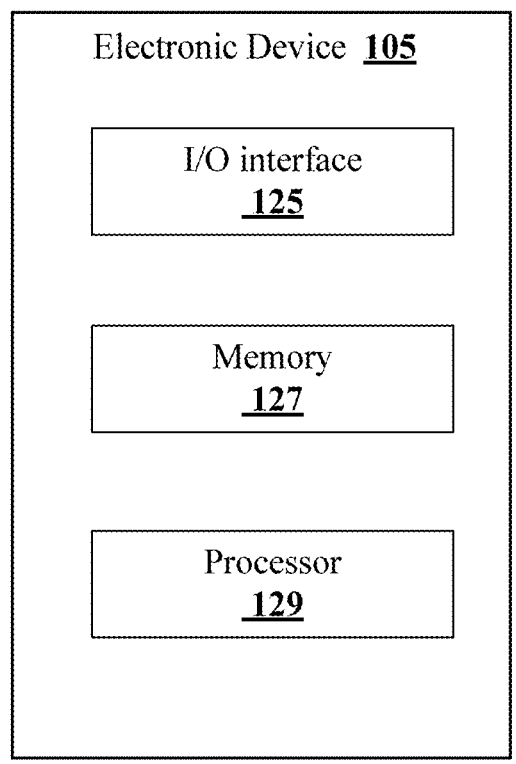
FIG. 3a shows a block diagram illustrating an electronic device for providing media personalization for one or more users in accordance with some embodiments of the present disclosure.

FIG. 3a shows a block diagram illustrating an electronic device for providing media personalization for one or more users in accordance with some embodiments of the present disclosure.

The electronic device 105 comprises an I/O interface 125, a processor 129, and a memory 127. The I/O interface 125 is configured to receive data from the user devices 101. In an embodiment, each user device 101 is associated with one or more users. The data is related to the profile information corresponding to the one or more users and also the monitored media consumption pattern of the one or more users. The received data is stored in the memory 127. The memory 127 is communicatively coupled to the processor 129. The processor 129 performs one or more instructions stored in the memory 127 to assign the operation status to one or more users and also to provide the analytics related to the media consumption pattern of each of the one or more users.

Figure 3B:
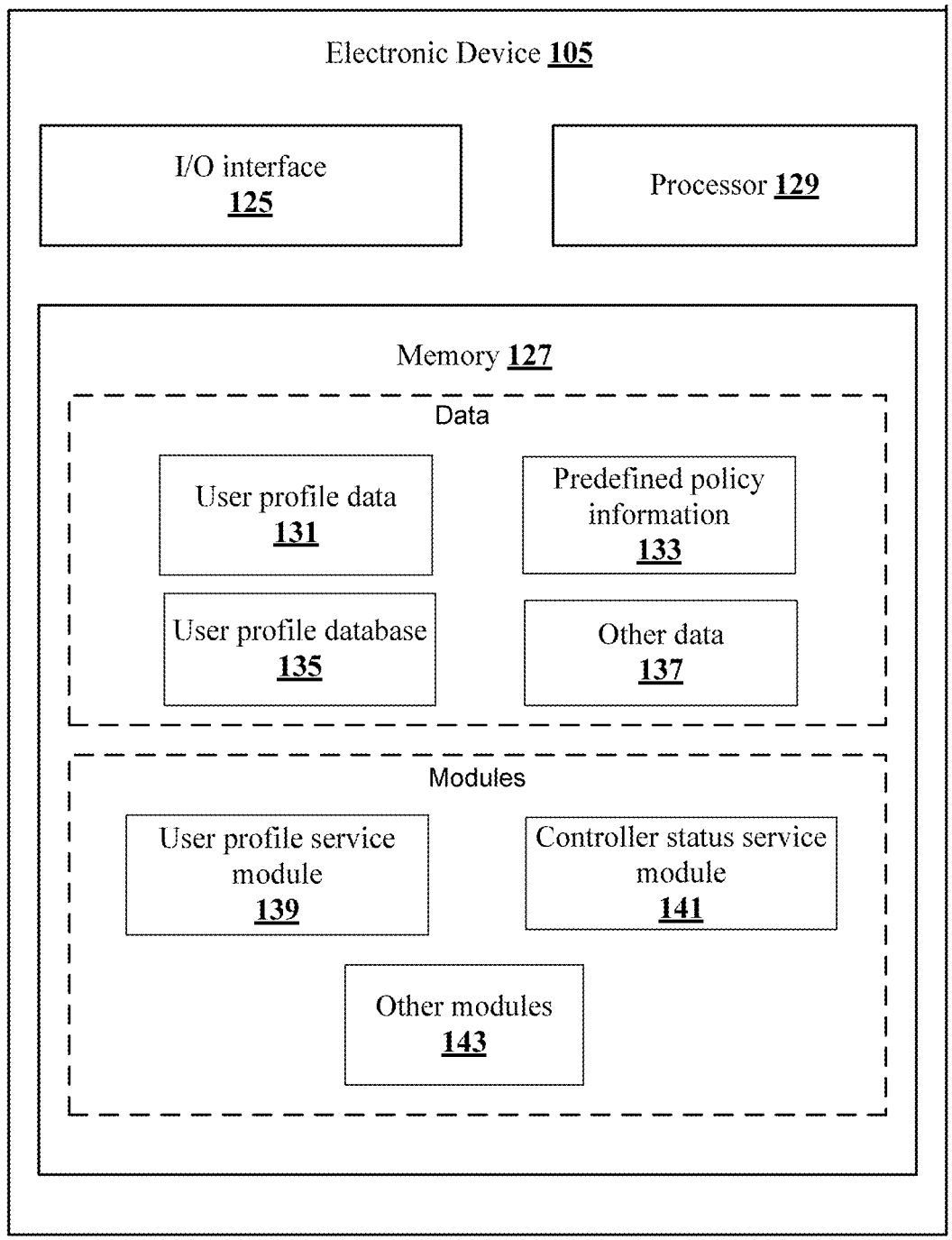
FIG. 3b shows a detailed block diagram illustrating an electronic device for providing media personalization for one or more users in accordance with some embodiments of the present disclosure.

FIG. 3b shows a detailed block diagram illustrating an electronic device for providing media personalization for one or more users in accordance with some embodiments of the present disclosure.

In one implementation, the I/O interface configured in the electronic device 105 receives data from the user devices 101 associated with the one or more users. As an example, the electronic device 105, may include, but not limited to, a set-top box (STB), a media gateway box and a digital video recorder (DVR). The electronic device 105 stores the data received in a memory 127. In an embodiment, the data includes user profile data 131, predefined policy data 133 and other data. The memory also stores a user profile database 135.

In one embodiment, the data may be stored in the memory 127 in the form of various data structures. Additionally, the aforementioned data can be organized using data models, such as relational or hierarchical data models. The other data 137 may store data, including temporary data and temporary files, generated by modules for performing the various functions of the electronic device 105.

In another embodiment, the user profile data 131 is received from each of the one or more user devices 101 associated with the one or more users. The user profile data 131 includes, but not limited to, profile information of the one or more users, login details related to the profile of the one or more users, operation status of the profile such as active or passive, list of device identification numbers with which the user was associated, preferences of the user such as brightness settings, contrast settings etc. list of the programs watched, history related to the purchases made by the one or more users and list of favorite programs of the one or more users. The user profile data 131 is stored in the user profile database 135 configured in the electronic device 105.

In an embodiment, the predefined policy data 133 is related to the rules set by the one or more users of the electronic device 105. As an example, the predefined policy information 133 may include, but not limited to, set of rule for setting the active operation status for the users, media usage limit etc. As an example, if there are four users for the electronic device 105 then the priority for each user to obtain the active operation status is based on the predefined policy information 133.

In an embodiment, the data stored in the memory 127 are processed by the modules of the electronic device 105. The modules may be stored within the memory 127 as shown in the FIG. 3b. In an example, the modules, communicatively coupled to the processor 129, may also be outside the memory 127.

In an embodiment, the modules may include, for example, a user profile service module 139, a controller status service module 141 and other modules 143. The other modules 143 may be used to perform various miscellaneous functionalities of the electronic device 105. It will be appreciated that such aforementioned modules may be represented as a single module or a combination of different modules.

In an embodiment, the user profile service module 139 is configured to receive request to manage the profile operations, from the user profile module 117 configured in each of the user device 101. The user profile service module 139 manages profile operations for example, creation of profiles for each of the one or more users, addition of profiles for each of the one or more users, modification of profiles for each of the one or more users and updating of profiles for each of the one or more users. The relationship between the user profiles, the user device 101 and the electronic device 105 can be at least one of one to one, one to many, many to one and many to many. As an example, one user device 101 interacts with one electronic device 105, one user device 101 interacts with N number of electronic devices 105 such as STB, N number of user devices 101 interact with one electronic device 105 and N number of user devices 101 interact with N number of electronic devices 105 such as STB. Further, the user profile service module 139 receives the monitored media consumption pattern of the one or more users from a media consumption monitoring module 119 configured in the user device 101. Further, the user profile service module 139 performs the light weight analytics of the monitored media consumption information of the user with active operation status to provide only the targeted recommendations. Also, the user profile service module 139 provides the monitored media consumption information of the user with active operation status to a data collector associated with the electronic device 105.

In an embodiment, the controller status service module 141 is configured to receive profile activation requests from a controller status module 121 configured in the user device 101 to activate a predefined profile associated with the one or more users. Upon receiving the profile activation requests, the controller status service module 141 assigns active operation status to one of the one or more users of the user device 101 and a passive operation status to rest of the one or more users of the user device 101. The user device 101 having the active operation status is activated with a primary functionality of controlling the electronic device 105 and one or more secondary functionalities are activated for the rest of the one or more users having the passive operation status. In an embodiment, the primary functionality may include, but not limited to, changing channels, increasing or decreasing the volume and resolution settings and the one or more secondary functionalities may include, but not limited to, video recording and browsing. Further the controller status service module 141 maintains a record of the operation status assigned to each of the one or more users and provides the information to the controller status module 141. Based on the information, the controller status module 141 retrieves the profile of the user device 101 which has been assigned the active operation status and the profile is activated. When the active user logs out of the profile or wants to relinquish the active operation status, the controller status service module 141 enables switching of the operation status from one user to another based on the priority information stored in the predefined policy information 133.

Figure 4A:
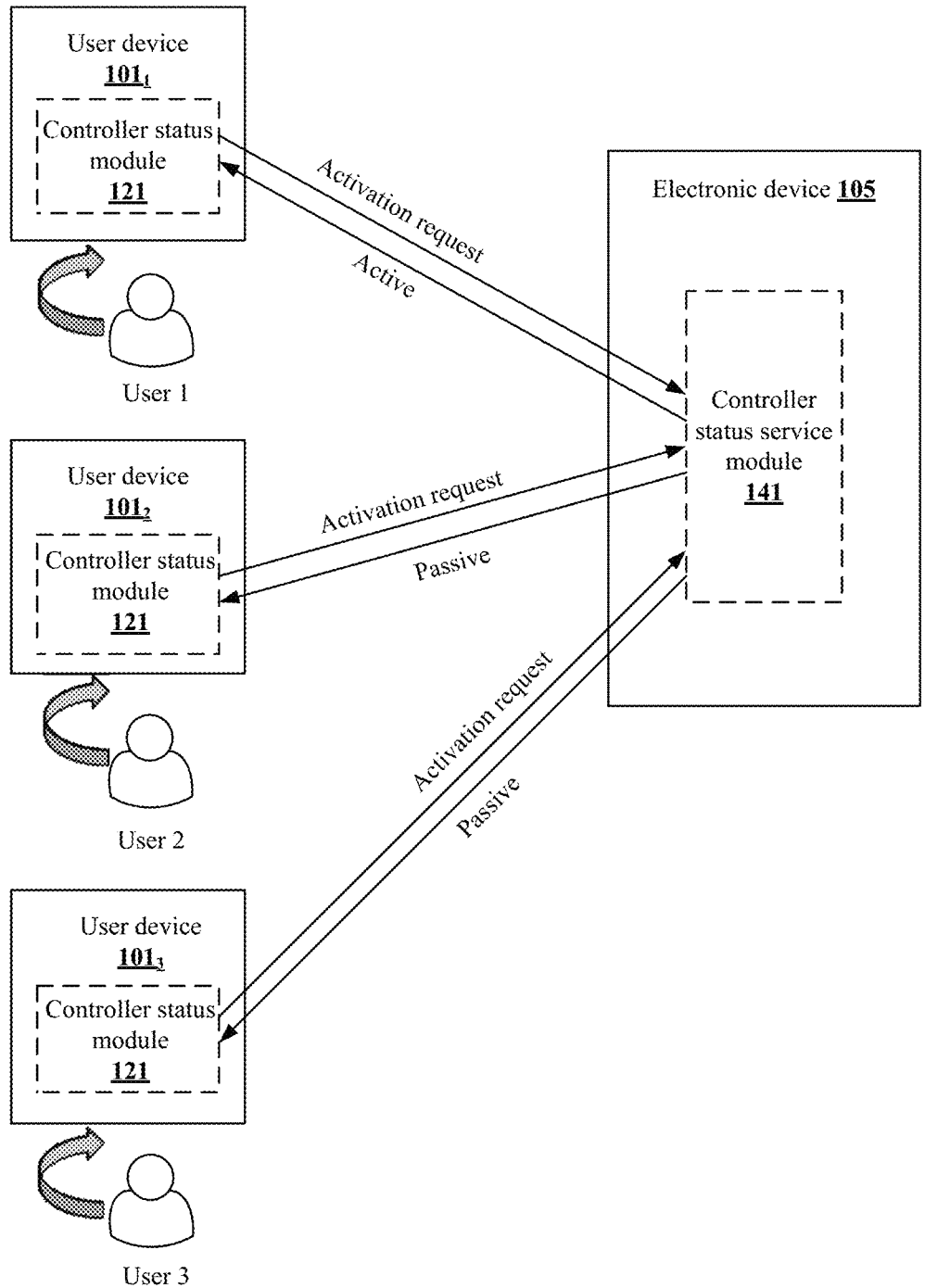
FIG. 4a illustrates an exemplary method for assigning operation status to one or more users in accordance with some embodiments of the present disclosure.

FIG. 4a illustrates one exemplary method for assigning operation status to one or more users in accordance with some embodiments of the present disclosure.

As an example, user 1 logs into the remote application through user device 1 1011, wherein user device 1 1011 is a mobile phone. User 2 logs into the remote application through user device 1012, wherein user device 1012 is a tablet phone. User 3 logs into the remote application through user device 3 1013, wherein user device 3 1013 is a laptop. User 1, user 2 and user 3 log into the remote application simultaneously for operating the electronic device i.e STB. A profile activation request is sent from the respective controller status module 121 configured in the mobile, the tablet and the laptop to a controller status service module 141 configured in an electronic device 105. The controller status service module 141 provides the active operation status to one of the three users based on the priority set in the predefined policy information 133 as the log in time is same for all the three users. The user 1 has the highest priority as per the predefined policy information 133. Hence user 1 is assigned with the active operation status and the user 2 and user 3 are assigned with passive operation status. If the user of the electronic device 105 with active operation status relinquishes the control, then the user of the electronic device 105 with the next priority set in the predefined policy information 133 is provided with the active operation status. As an example, a family comprises father, mother and two kids. Father uses mobile phone as the user device 101, mother uses a tablet phone as the user device 101 and kids use mobile phones as their user devices 101. Father's mobile phone has the current active operation status but wants to relinquish the active control. Immediately a notification related to the inactive status of the father is provided to each of the one or more other users using their respective user devices 101. The active operation status is now provided to the mother's tablet phone, who has the next priority according to the predefined policy information 133.

Figure 4B:
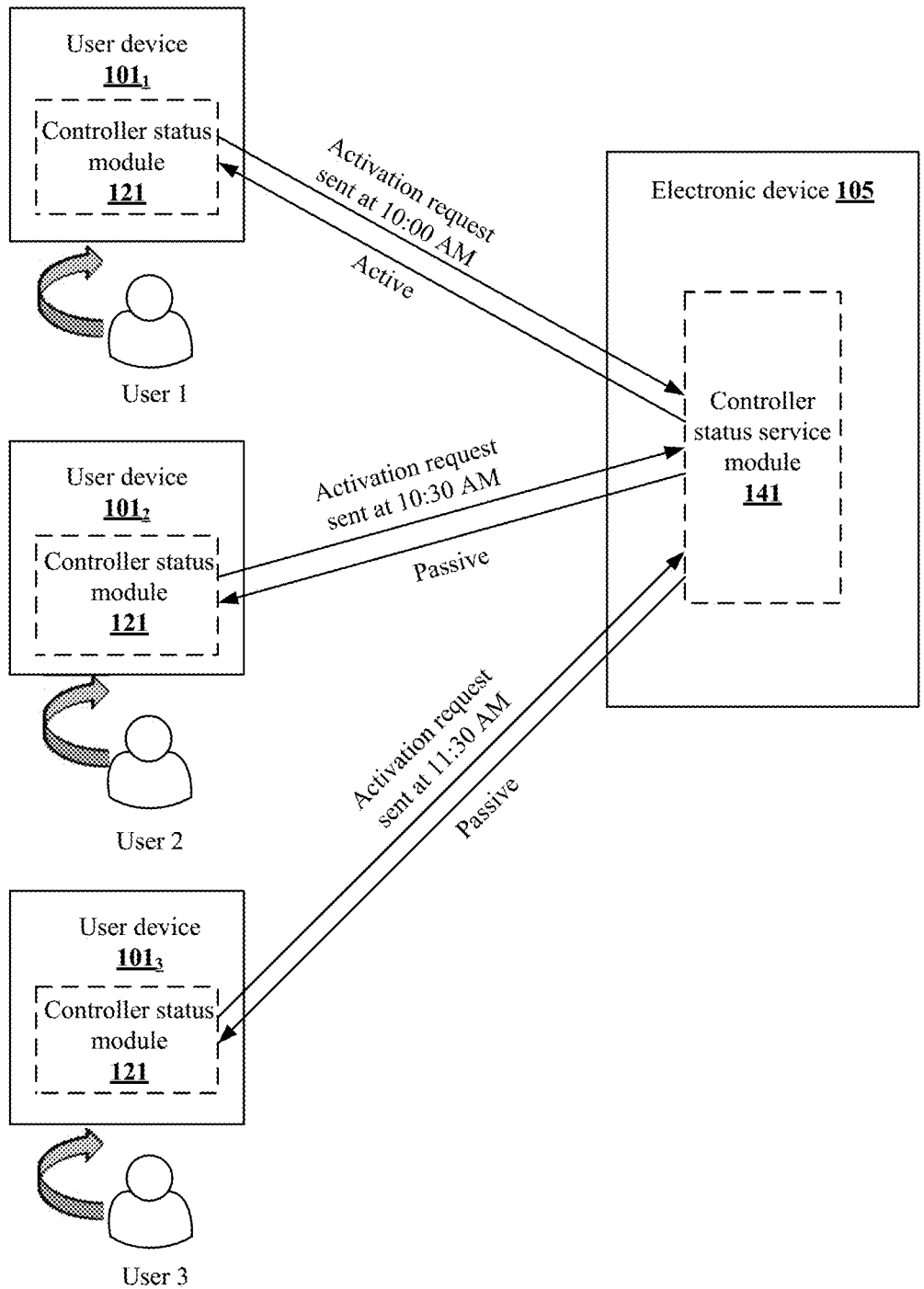
FIG. 4b illustrates another exemplary method for assigning operation status to one or more users in accordance with some embodiments of the present disclosure.

FIG. 4b illustrates another exemplary method for assigning operation status to one or more users in accordance with some embodiments of the present disclosure.

As an example, user 1 logs into the remote application through user device 1 1011, wherein user device 1011 is a mobile phone. User 2 logs into the remote application through user device 2 1012, wherein user device 2 1012 is a tablet phone. User 3 logs into the remote application through user device 3 1013, wherein user device 1013 is a laptop. User 1 logs in for operating the electronic device 105 i.e STB and sends a profile activation request from a controller status module 121 configured in the mobile to a controller status service module 141 at 10:00 AM. The controller status service module 141 is configured in an electronic device 105. User 2 logs in for operating the electronic device 105 i.e STB and sends a profile activation request from the controller status module 121 configured in the tablet to the controller status service module 141 at 10:30 AM. User 3 logs in for operating the electronic device 105 i.e STB and sends a profile activation request to from the controller status module 121 configured in the laptop to the controller status service module 141 at 11:30 AM. All three users logged in at different time. Hence, the user 1 is assigned with the active operation status since the log in time of the first user is earliest.

Figure 5:
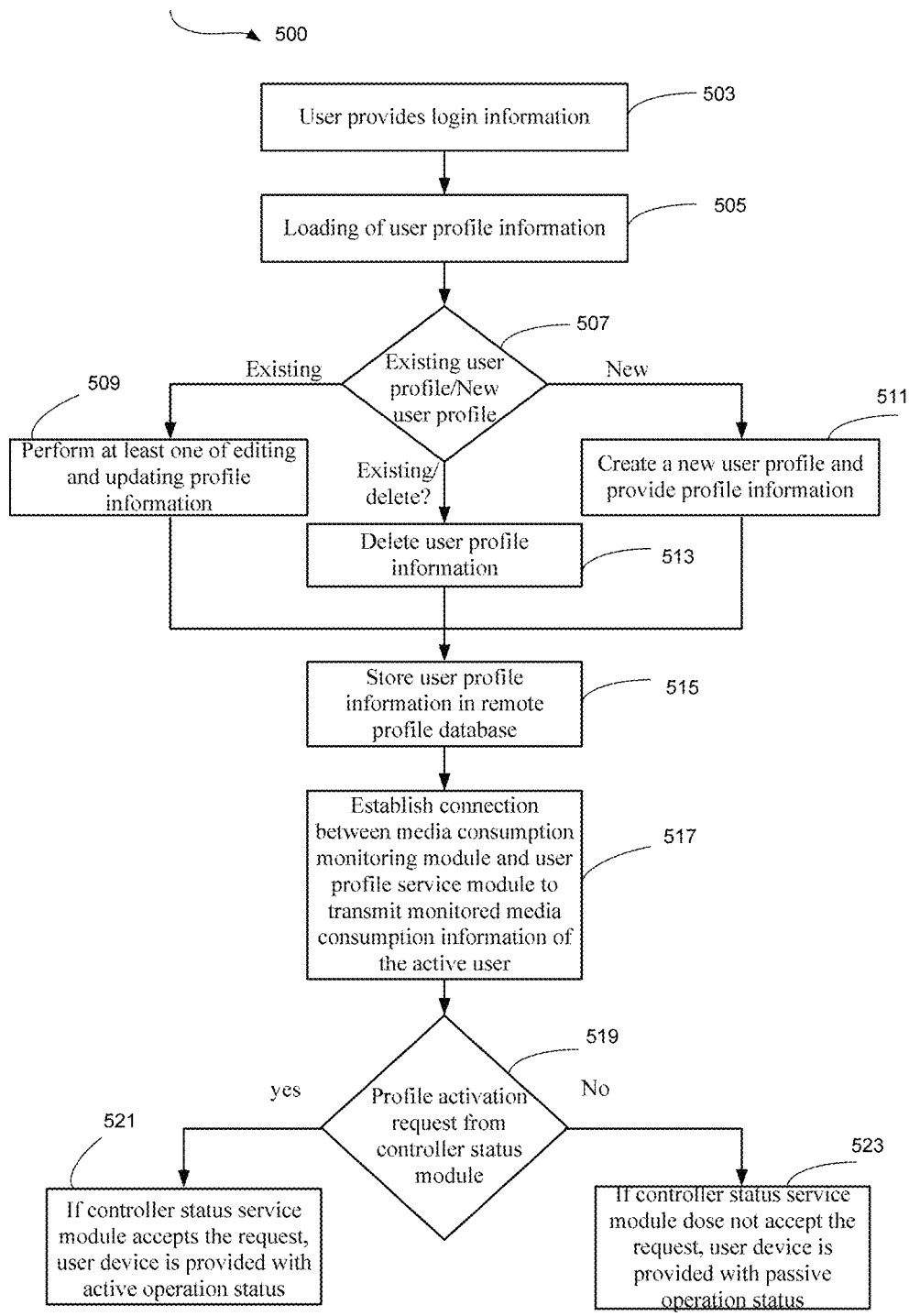
FIG. 5 shows an exemplary method for creating of a user profile and assigning operation status to the one or more users, implementing embodiments consistent with the present disclosure.

FIG. 5 shows an exemplary method for creation of a user profile implementing embodiments consistent with the present disclosure.

At block 503, the user logs into a remote application in the user device 101 by providing login information. The login information may include but not limited to name of the user and the password set by the user.

At block 505, the profile information of the user is loaded from a remote profile database 113 configured in the user device 101.

At block 507, the condition is checked to see if the profile of the user already exists. If the profile of the user exists, then the method proceeds to block 509 via "Existing". If the profile of the user exists but the user wants to delete the profile, then the method proceeds to block 513 via "Existing/delete". If the profile does not exist, then the method proceeds to block 511 via "New". At block 509, of the user may either edit or update the profile already created by the user. At block 513, the user may delete the profile. At block 511, the user may create a new profile At block 515, the user device 101 stores the updated, edited and the new profile information of the user in the remote profile database 113.

At block 517, a connection is established between the user device 101 and electronic device 105. The monitored media consumption information of the user with active operation status is provided to the user profile service module 139 by the media consumption monitoring module 119 in the user device 101.

At block 519, the condition is checked to see if controller status service module 141 accepts the profile activation request sent by the controller status module 121 from each of the user devices. If the controller status service module 141 accepts the profile activation request, then the method proceeds to block 521 via "yes". If the controller status service module 141 does not accept the profile activation request, then the method proceeds to block 523 via "No".

At block 521, the controller status service module 141 accepts the profile activation request sent by the controller status module 121 based on the predefined policy information 133 and the user of the user device 101 is provided with the active operation status.

At block 523, the controller status service module 141 does not accept the profile activation request sent by the controller status module 121 based on the predefined policy information 133 and the user of the user device 101 is provided with the passive operation status.

Figure 6:
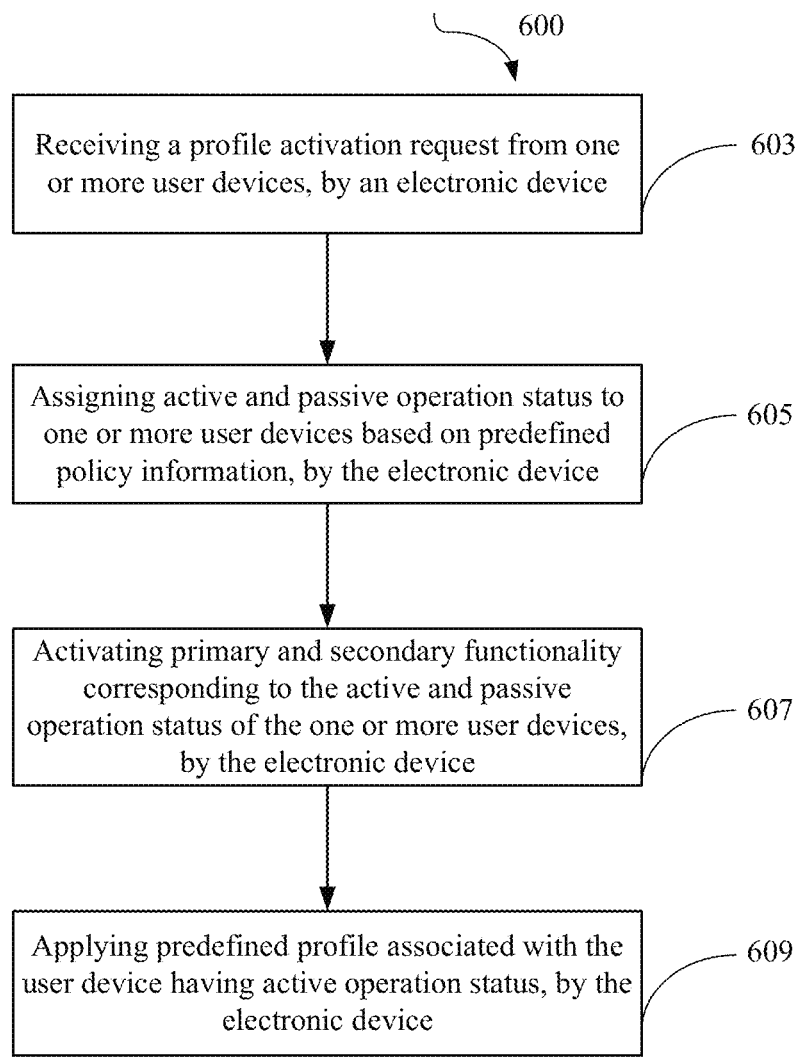
FIG. 6 shows a flowchart illustrating a method of providing media personalization for one or more users using an electronic device in accordance with some embodiments of the present disclosure.

FIG. 6 illustrates a method of providing media personalization for one or more users with some embodiments of the present disclosure.

As illustrated in FIG. 6, the method 600 comprises one or more blocks illustrating a method of providing media personalization for one or more users. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 603, a profile activation request is received by the electronic device 105. In an embodiment, the profile activation request is received by the electronic device 105 from one or more user devices 101 for activation of user profile. As an example, the one or more user devices 101 may be a mobile phone, a tablet phone, a laptop and a personal computer. Each user profile is associated with a user device 101. Also the user profile may include as an example, profile information of the one or more users, login details related to the profile of the one or more users, operation status of the profile such as active or passive, list of device identification numbers with which the user was associated, preferences of the user such as brightness settings, contrast settings etc. list of the last few programs watched by the users, history related to the purchases made by the one or more users and list of favorite programs of the one or more users.

At block 605, operation status is assigned by the electronic device 105. In an embodiment, the active operation status is assigned to one of the one or more users using the user device 101 and passive operation status is assigned to rest of the one or more users using the user device 101 based on predefined policy information 133. The predefined policy information 133 is stored in a memory 127 configured in the electronic device 105.

At block 607, functionalities are activated by the electronic device 105. In an embodiment, primary functionality of controlling the electronic device 105 is associated with the user device 101 having active operation status. The primary functionality may include, but not limited to, changing channels, increasing or decreasing the volume and resolution settings. In another embodiment, one or more secondary functionalities are associated with the one or more users using the user device 101 having passive operation status. The one or more secondary functionalities may include, but not limited to, video recording and browsing.

At block 609, predefined profile is applied. In an embodiment, the predefined profile associated with the user device 101 having active operation status is applied and monitored.

Advantages of the Embodiment of the Present Disclosure are Illustrated Herein

In an embodiment, the present disclosure provides a method for media personalization for one or more users using an electronic device.

The present disclosure provides a feature wherein, a remote application is used to create multiple user profiles to control the electronic device from multiple profiles on one user device or multiple user devices simultaneously.

The present disclosure also monitors various parameters at a user profile level, storing media consumption pattern of each user profile to provide media personalization to the one or more users and to perform analytics in the backend.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and an electronic device to provide media personalization for one or more users. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, computer readable storage media may be utilized in implementing embodiments consistent with the present disclosure. A computer readable storage medium refers to any type of physical memory on which information or data readable by a processor may be stored. Thus, a computer readable storage medium may store instructions for execution by one or more processors, including instructions for causing the processor(s) to perform steps or stages consistent with the embodiments described herein. The term "computer readable storage medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | system |
| 101 | User device |
| 103 | Communication network |
| 105 | Electronic device |
| 106 | User interface |
| 107 | Memory unit |
| 109 | Processing unit |
| 111 | User profile data |
| 113 | Remote profile database |
| 115 | Other data |
| 117 | User profile module |
| 119 | Media consumption monitoring module |
| 121 | Controller status module |
| 123 | Other modules |
| 125 | I/O interface |
| 127 | Memory |
| 129 | Processor |
| 131 | User profile data |
| 133 | Predefined policy information |
| 135 | User profile database |
| 137 | Other data |
| 139 | User profile service module |
| 141 | Controller status service module |
| 143 | Other modules |

What is claimed is:

1. A method of providing media personalization for one or more users, the method comprising:

receiving, by an electronic device, a profile activation request from one or more user devices for activating a profile associated with each of the one or more users;

assigning, by the electronic device, an active operation status for one of the one or more user devices and a passive operation status for rest of the one or more user devices based on policy information, wherein the active operation status is associated with a primary functionality of controlling the electronic device, and wherein the passive operation status is associated with one or more secondary functionalities;

activating, by the electronic device, a primary functionality of controlling the electronic device for the user device having the active operation status and one or more secondary functionalities for the rest of the one or more user devices;

applying, by the electronic device, the profile associated with the user having the active operation status; and monitoring, by the electronic device, media consumption pattern associated with the user device having the active operation status, wherein the monitored media consumption pattern is analyzed by the electronic device for providing one or more recommendations.

2. The method as claimed in claim 1 further comprises receiving by the video management computing device the profile associated with each of the one or more users from the respective one or more user devices upon receiving the profile activation request from the one or more user devices.

3. The method as claimed in claim 2 further comprises performing by the video management computing device one or more actions on the profile associated with each of the one or more users, wherein the one or more actions are at least one of creating the profile, adding the profile, deleting the profile and modifying the profile.

4. The method as claimed in claim 1, wherein one of the rest of the one or more user devices is assigned with the active operation status upon detecting the operation status of the user device having the active operation status to be inactive based on the policy information.

5. The method as claimed in claim 4, wherein a notification is provided to each of the one or more user devices upon detecting the operation status of the user device having the active operation status to be inactive.

6. The method as claimed in claim 1, wherein the analyzed information associated with the monitored media consumption pattern is provided to a data collector module associated with the electronic device for further analysis of the media consumption pattern.

7. The method as claimed in claim 1, wherein the information associated with the monitored media consumption pattern and the profile associated with each of the one or more users is stored in a memory associated with the electronic device.

8. The method as claimed in claim 1, wherein the profile is at least one of predefined by each of the one or more users and dynamically generated based on user interaction with the electronic device.

9. The method as claimed in claim 1, wherein the policy information is at least one of predefined and dynamically generated by a service provider of the electronic device.

10. The method as claimed in claim 1, wherein the user profile associated with each user is configurable in the one or more user devices.

11. An electronic device for providing media personalization for one or more users, the electronic device comprising:

at least one processor; and a memory communicatively coupled to the processor, wherein the memory stores processor-executable instructions, which, on execution, causes the processor to:

receive a profile activation request from one or more user devices for activating a profile associated with each of the one or more user devices;

assign an active operation status for one of the one or more user devices and a passive operation status for rest of the one or more user devices based on policy information, wherein the active operation status is associated with a primary functionality of controlling the electronic device, and wherein the passive operation status is associated with one or more secondary functionalities;

activate a primary functionality of controlling the electronic device for the user device having the active operation status and one or more secondary functionalities for the rest of the one or more user devices;

apply the profile associated with the user device having the active operation status for the media personalization; and monitor media consumption pattern associated with the user device having the active operation status, wherein the monitored media consumption pattern is analyzed by the electronic device for providing one or more recommendations.

12. The electronic device as claimed in claim 11, wherein the instructions further configure the at least one processor to receive the profile associated with each of the one or more user devices from the respective one or more user devices upon receiving the profile activation request from the one or more user devices.

13. The electronic devices as claimed in claim 11, wherein the instructions configure the at least one processor to perform one or more actions on the profile associated with each of the one or more users.

14. The electronic device as claimed in claim 13, wherein the one or more actions are at least one of creating the profile, adding the profile, deleting the profile and modifying the profile.

15. The electronic device as claimed in claim 11, wherein one of the rest of the one or more user devices is assigned with the active operation status upon detecting the operation status of the user device having the active operation status to be inactive.

16. The electronic device as claimed in claim 15 provides a notification to each of the one or more user devices upon detecting the operation status of the user device having the active operation status to be inactive.

17. The electronic device as claimed in claim 11, wherein the instructions configure the at least one processor to provide analyzed information, associated with the monitored media consumption pattern, to a data collector module associated with the electronic device for further analysis of the media consumption pattern.

18. The electronic device as claimed in claim 11, wherein the memory is further configured to:

store information associated with the profile of each of the one or more users; and store the information associated with the monitored media consumption pattern of the user device having the active operation status.

19. A non-transitory computer readable medium including instructions stored thereon that when processed by at least one processor cause an electronic device to perform operations comprising:

receiving a profile activation request from one or more user devices for activating a profile associated with each of the one or more users;

assigning an active operation status for one of the one or more user devices and a passive operation status for rest of the one or more user devices based on policy information, wherein the active operation status is associated with a primary functionality of controlling the electronic device, and wherein the passive operation status is associated with one or more secondary functionalities;

activating a primary functionality of controlling the electronic device for the user device having the active operation status and one or more secondary functionalities for the rest of the one or more user devices;

applying the profile associated with the user having the active operation status for the media personalization; and monitoring media consumption pattern associated with the user device having the active operation status, wherein the monitored media consumption pattern is analyzed by the electronic device for providing one or more recommendations.

* * * * *